United States Patent
Voyer (10) Patent No.: US 8,285,320 B2
(45) Date of Patent: Oct. 9, 2012

(54) METHOD FOR CONTROLLING THE OPERATION OF A BASE STATION OF A WIRELESS CELLULAR TELECOMMUNICATION NETWORK

(75) Inventor: Nicolas Voyer, Rennes Cedex (FR)

(73) Assignees: Mitsubishi Electric Information Technology Centre Europe B.V., Schiphol Rijk (NL); Mitsubishi Electric Corporation, Tokyo (JP)

( * ) Notice: Subject to any disclaimer, the term of this patent is extended or adjusted under 35 U.S.C. 154(b) by 529 days.

(21) Appl. No.: 12/596,153

(22) PCT Filed: Apr. 22, 2008

(86) PCT No.: PCT/EP2008/003207
§ 371 (c)(1), (2), (4) Date: Oct. 16, 2009

(87) PCT Pub. No.: WO2008/128752
PCT Pub. Date: Oct. 30, 2008

(65) Prior Publication Data
US 2010/0137016 A1 Jun. 3, 2010

(30) Foreign Application Priority Data
Apr. 23, 2007 (EP) .................................. 07008191

(51) Int. Cl.
*H04B 7/00* (2006.01)
(52) U.S. Cl. .......... 455/522; 455/67.11; 455/68; 455/69
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| 7,079,850 | B2* | 7/2006 | Cameron ................... 455/456.1 |
| 7,818,023 | B2* | 10/2010 | Li et al. ......................... 455/522 |
| 2002/0193115 | A1* | 12/2002 | Furukawa et al. ............ 455/442 |
| 2003/0135666 | A1* | 7/2003 | Kim .................................. 710/1 |
| 2004/0136336 | A1* | 7/2004 | Nakamura et al. ............ 370/328 |
| 2004/0192371 | A1* | 9/2004 | Zhao et al. .................... 455/522 |
| 2007/0026887 | A1 | 2/2007 | Voyer et al. |
| 2007/0218949 | A1* | 9/2007 | Cleveland ..................... 455/561 |
| 2007/0238418 | A1* | 10/2007 | Mizusawa et al. .............. 455/69 |
| 2007/0264949 | A1* | 11/2007 | Matsumura ................... 455/135 |
| 2008/0298275 | A1* | 12/2008 | De Sousa ..................... 370/255 |

FOREIGN PATENT DOCUMENTS

| EP | 1 748 665 | 1/2007 |
| WO | 2005 032202 | 4/2005 |

* cited by examiner

*Primary Examiner* — Dominic E Rego
(74) *Attorney, Agent, or Firm* — Oblon, Spivak, McClelland, Maier & Neustadt, L.L.P.

(57) ABSTRACT

A method for controlling operation of a first base station of a wireless cellular telecommunication network including plural base stations and a server. The first base station sets transmission power of signals transferred by the first base station at a first transmission power value, detects a predetermined signal transferred by a mobile terminal, and if a predetermined signal is detected: establishes a communication link with the server, obtains from the server information identifying each second base station that manages a cell that is neighbor of the cell managed by the first base station and that is transferring signals at a second transmission power higher than the first transmission power value, establishes a communication link with each second base station, and sets the transmission power of the signals transferred by the first base station at a second transmission power value higher than the first transmission power.

13 Claims, 5 Drawing Sheets

METHOD FOR CONTROLLING THE OPERATION OF A BASE STATION OF A WIRELESS CELLULAR TELECOMMUNICATION NETWORK

The present invention relates to a method for controlling the operation of a base station of a wireless cellular telecommunication network.

Classical wireless cellular telecommunication networks provide coverage of wireless services in wide areas. Macro-cells are used to pave the coverage area of the wireless cellular telecommunication network.

A macro-cell has a coverage area around ten $km^2$.

Each cell is controlled by one base station, which has to be connected to each base station controlling a neighbour cell of the cell.

At the setup of a base station, the base station configures the radio interface, the network interface, i.e. configures the connexion links with neighbour base stations and servers and starts transmitting on a broadcast channel, together with pilot signals and so on. The mobile terminal which is located in the cell managed by the base station can make measurements on these signals so as prepare/trigger a handover from the base station which is currently managing the cell in which the mobile terminal is located to another cell managed by another base station.

When numerous macro-cells are deployed within an area, each cell should be configured with a different cell identifier, and the radio resource of each macro-cell should be configured so as to minimise interference produced by other macro-cells.

The configuration of the connection links, identifiers allocation and interferences problems are important points to be considered and solved in classical wireless cellular telecommunication networks.

When the wireless cellular telecommunication networks also comprises micro-cells which have a reduced a coverage area around 0.1 $km^2$, the number of neighbour cells of a macro-cell increases. The problems generated by the increase of the number of connection links, of identifiers and interferences problems increase.

Aforementioned problems become more important with pico-cells or femto-cells. It has been proposed to extend the coverage of Public Land Mobile Networks or (PLMN) wireless cellular telecommunication networks with pico-cells and femto-cells. A pico-cell has a coverage area around few thousands $m^2$, while a femto-cell has a coverage area around hundred $m^2$ As for Macro and micro-cells, each base station which manages one pico-cell has to be connected to each base station controlling a neighbour cell of the pico-cell.

When numerous pico-cells are deployed over an area widely covered by a macro-cell, each pico-cell should be configured with a different cell identifier, and the radio resource of each pico-cell should be configured so as to minimise interference produced by other pico-cells. Radio resource has to be split over pico-cells, each pico-cell getting reduced capacity.

When numerous pico-cells are deployed, the micro or macro-cell should be configured to support a large number of neighbour cells. Mobile terminals in micro-cell should scan all possible neighbour cells. This process is long and battery consuming.

According to prior art, when a pico-cell is setup, it should be connected to a server and to the other base stations that manage other neighbour cells. When numerous pico-cells are setup, the server and the other base stations should maintain a high number of communication links between each other, even though there is no traffic activity on each communication link. This consumes memory and processing capabilities of the server as well as the base stations.

As it as been disclosed for macro and micro cells, when a pico-cell is setup, the base station which manages the pico-cell should transmit pilot signals so as to let mobile terminals prepare any handover. This produces interference to other cells. Interference generated by huge number of pico-cells and femto-cells to micro-cells or macro-cells can be significant and reduce the quality of the downlink channel of the macro and micro-cells.

The aim of the invention is therefore to propose a method and a device which enable to avoid that too many communication links need to be configured and that interference problems are reduced in a wireless cellular telecommunication network.

To that end, the present invention concerns a method for controlling the operation of a first base station of a wireless cellular telecommunication network composed of plural base stations and of a server, characterised in that the method is executed by the first base station and comprises the steps of:
  setting the transmission power of the signals transferred by the first base station in the cell managed by the first base station at a first transmission power value,
  detecting a predetermined signal transferred by a mobile terminal of the wireless cellular telecommunication network,
  and if a predetermined signal transferred by the mobile terminal is detected:
  establishing a communication link with the server,
  obtaining from the server, information identifying each second base station which manages a cell which is neighbour of the cell managed by the first base station and which is transferring signals in the cell the second base station manages at a transmission power higher than the first transmission power value,
  establishing a communication link with each second base station,
  setting the transmission power of the signals transferred by the first base station in the cell managed by the first base station at a second transmission power value higher than the first transmission power.

The present invention concerns also a device for controlling the operation of a first base station of a wireless cellular telecommunication network composed of plural base stations and of a server, characterised in that the device for controlling the operation is included in the first base station and comprises:
  means for setting the transmission power of the signals transferred by the first base station in the cell managed by the first base station at a first transmission power value,
  means for detecting a predetermined signal transferred by a mobile terminal of the wireless cellular telecommunication network,
  means for establishing a communication link with a server,
  means for obtaining from the server, information identifying each second base station which manages a cell which is neighbour of the cell managed by the first base station and which is transferring signals in the cell the second base station manages at a transmission power higher than the first transmission power value,
  means for establishing a communication link with each second base station,
  means for setting the transmission power of the signals transferred by the first base station in the cell managed by the first base station at a second transmission power value than the first transmission power.

Thus, as the transmission power of the signals transferred by the first base station in the cell managed by the first base station is set at a first transmission power value when no signals generated by a mobile terminal are detected, the transmission power value being lower than the transmission power value set when signals generated by a mobile terminal are detected, interferences produced by the first base station to mobile terminals located in cells of other base stations are decreased in an important manner.

Furthermore, as the communication links are established only when signals generated by a mobile terminal are detected, the number of communication links between base stations and between base stations and the server of the wireless cellular telecommunication network is reduced.

Thus, when a mobile terminal gets in the vicinity of the base station which is detecting the predetermined signal, the mobile terminal activates the base station and the mobile terminal can communicate via the base station. The coverage of the wireless cellular system is then extended for such mobile terminal.

Furthermore, when a mobile which is involved in a communication with a remote telecommunication device through another base station is in the vicinity of the base station which is detecting the predetermined signal, the mobile terminal can detect the signals transferred by the base station and can trigger a handover, so as to continue the communication through the base station. The quality of the communication is enhanced.

According to a particular feature, when the transmission power of the signals transferred by the first base station in the cell managed by the first base station is set at the higher transmission power value than the first transmission power, the first base station:
    activates a timer,
    checks if at least another predetermined signal is transferred by the or another mobile terminal of the wireless cellular telecommunication network.

According to a particular feature, the first base station monitors the number of mobile terminals which are in communication with at least one remote telecommunication device through the first base station and activates the timer if no mobile terminal is in communication with one remote telecommunication device through the first base station.

Thus, the first base station is aware about the number of mobile terminals which are currently using the communication resources of the first base station.

According to a particular feature, the first base station deactivates the timer if at least another predetermined signal is transferred by the or another mobile terminal of the wireless cellular telecommunication network or if at least one mobile terminal is in communication with at least one remote telecommunication device through the first base station.

According to a particular feature, the first base station checks if the timer expires, and if the timer expires, releases the communication links with the server and with each second base station and sets the transmission power of the signals transferred by the first base station in the cell managed by the first base station at the first transmission power value.

Thus, as the transmission power of the signals transferred by the first base station in the cell managed by the first base station is set at the first transmission power value when no signals generated by a mobile terminal are detected, inferences produced by the base station to mobile terminal located in cells of other base stations are decreased in an important manner.

Furthermore, as the communication links are released when no signals generated by a mobile terminal are detected, the number of communication links between base stations and between base stations and the server of the wireless cellular telecommunication network is reduced.

Thus, as the timer brings a latency in triggering the release of the communication links, the number of procedures to setup and release communication links between base stations and between base stations and the server is minimised.

According to a particular feature, the first transmission power value is equal to null value.

Thus, interferences are reduced.

According to a particular feature, the first base station transfers in the cell managed by the first base station a list comprising information identifying each neighbour of the cell managed by the first base station in which the signals are transferred at the higher transmission power.

Thus, the mobile terminal which is comprised in the cell managed by the first base station is only aware of the cells in which signals are transferred. The mobile terminal doesn't need to scan frequencies used by many second telecommunication devices.

The present invention concerns also a method for enabling a mobile terminal to be detected by at least one base station of a wireless cellular telecommunication network characterized in that the method comprises the steps executed by the mobile terminal of:
    checking if a signal transferred by one base station is detected,
    transferring a predetermined signal if the signal is not detected.

The present invention concerns also a device for enabling a mobile terminal to be detected by at least one base station of a wireless cellular telecommunication network characterized in that the device or enabling the mobile terminal to be detected is included in the mobile terminal and comprises:
    means for checking if a signal transferred by one base station is detected,
    means for transferring a predetermined signal if the signal is not detected.

Thus, the mobile terminal informs any base station which is susceptible to detect the predetermined information of its presence. The mobile terminal can activate a surrounding base station when it is no longer being covered by any base station.

According to a particular feature, the predetermined signal is a signal or a message transferred periodically.

Thus, the base station has multiple consecutives chances for detecting the predetermined signal. The mobile terminal has multiple chances to activate a surrounding base station.

According to a particular feature, the predetermined signal is representative of an uplink message of the wireless cellular communication system.

Thus, the base station might not detect mobile terminals in idle mode. The base station only activates when it detects the presence of mobile in active mode, which are actually transmitting data. The usage rate of the base station is minimised. This results in less interference produced to the wireless cellular communication system, as well as longer lifetime of components of the base station. The base station activates itself only when it is being needed to relay data being transmitted by the mobile terminal.

According to a particular feature, the predetermined signal is a predetermined signature that is modulated in a frequency band different from the frequency band used for the transmission of message from the mobile terminal to the base station.

Thus, the predetermined signal does not interfere the uplink messages of the wireless cellular communication system. A predetermined secret signature can be used so as to restrict the activation of the base station to a limited subset of mobile terminals of the wireless cellular communication system, which share the secret predetermined signature.

According to a particular feature, the predetermined signal is a predetermined encoded train of energy pulses that are propagated by radio or optical waves.

Thus, the predetermined signal is hard to intercept by malicious third parties, and the predetermined signal can be kept secret and restricted to a limited subset of mobile terminals of the wireless cellular communication system, which share the secret predetermined signature.

Furthermore, the power consumption for transmitting the predetermined signal is limited.

According to a particular feature, the mobile terminal:
checks if a signal transferred by one base station is detected,
stops the transfer of the predetermined signal if the signal is detected.

Thus, the mobile terminal can save its power resource.

According to still another aspect, the present invention concerns computer programs which can be directly loadable into a programmable device, comprising instructions or portions of code for implementing the steps of the methods according to the invention, when said computer programs are executed on a programmable device.

Since the features and advantages related to the computer programs are the same as those set out above related to the method and device according to the invention, they will not be repeated here.

The characteristics of the invention will emerge more clearly from a reading of the following description of an example embodiment, the said description being produced with reference to the accompanying drawings, among which.

Figure 1:
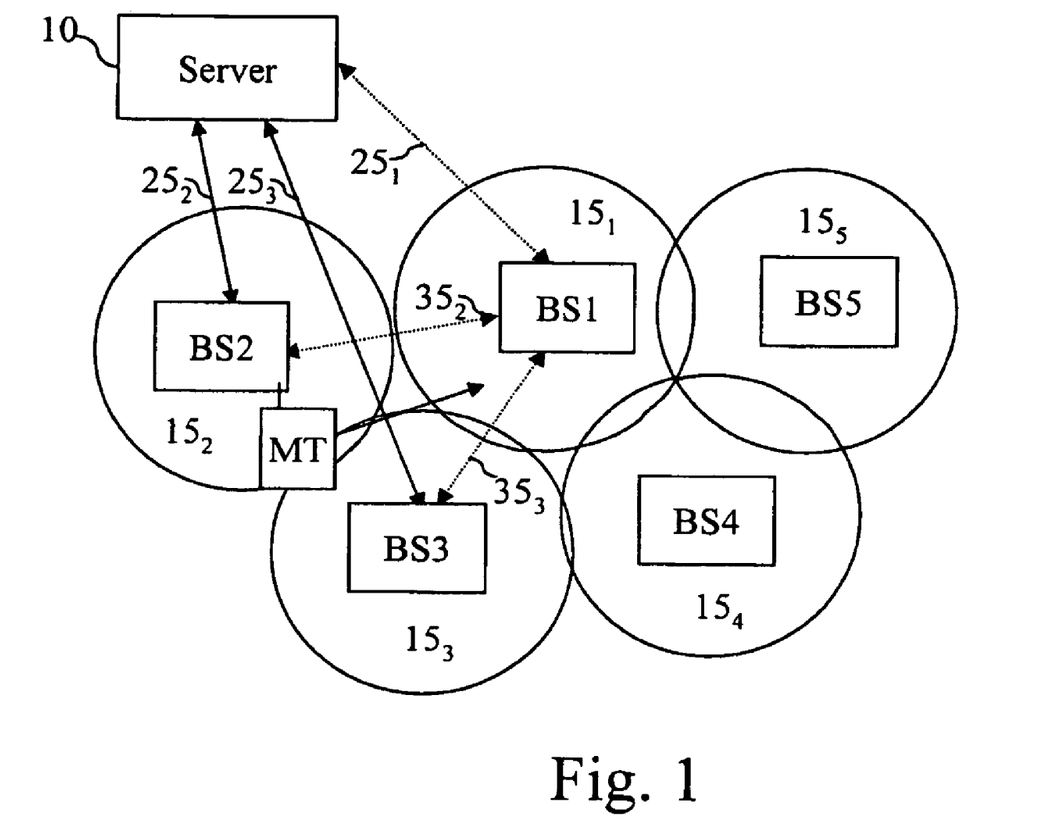
FIG. 1 is a diagram representing the architecture of a cellular telecommunication network according to the present invention.

In the cellular telecommunication network, a server 10 is able to be connected to a plurality of base stations BS1 to BS5 through a telecommunication network. The telecommunication network is a dedicated wired network or a public network like a public switched network or an IP based network or a wireless network or an Asynchronous Transfer Mode network or a combination of above cited networks.

The telecommunication network enables the base stations BS1 to BS5 to be connected together if needed and enables the transfer of messages and of information between the base stations BS1 to BS5 or between the base stations BS1 to BS5 and the server 10 according to the present invention.

Each base station BS1 to BS5 is able to transfer and or receive signals or messages through at least one wireless area 15. Such wireless area 15 will be called hereinafter a cell 15 managed by the base station BS. The cells 15 are macro-cells and/or micro-cells and/or pico-cells and/or femto-cells.

According to the example of the FIG. 1, the base station BS1 manages the cells $15_1$, the base station BS2 manages the cells $15_2$, the base station BS3 manages the cells $15_3$, the base station BS4 manages the cells $15_4$ and the base station BS5 manages the cells $15_5$.

The server 10 stores the information related to the base stations BS1 to BS5 of the cellular telecommunication network. For each base station BS1 to BS5, the server 10 stores information representative of the base stations BS which manage cells 15 which are neighbour of the cell 15 managed by the base station BS. The server 10 maintains the list of the base stations BS which are currently active, i.e. the base stations BS which transfer signals in their respective cells 15. The server 10 also maintains other parameters of inactive base stations BS like the base stations BS4 and BS5. The other parameters include connection and security information, such as IP address, TCP or SCTP ports, cipher keys, that enable quick setup of link between inactive base station BS and the server 10 when the inactive base stations become active.

In the FIG. 1, only one server 10 is shown, but we can understand that a more important number of servers 10 can be used in the present invention.

On a similar way, only five base stations BS1 to BS5 and their respective cells $15_1$ to $15_5$ are shown, but we can understand that a more important number of base stations BS and cells 15 are used in the present invention.

In Long Term Evolution (LTE) network currently under discussion in 3GPP, the server 10 is named a Mobility Management Entity (MME). In General Packet Radio Service network, the server 10 is named a Serving GPRS Support Node (SGSN). In mobile IP network, the server 10 is named a Foreign Agent (FA) and in GSM network, the server 10 is named a Visitor Location Register (VLR).

In the FIG. 1, a mobile terminal MT is shown. The mobile terminal MT is located in the cell $15_2$ of the base station BS2 and is moving into the cell $15_1$ of the base station BS1.

Only one mobile terminal MT is shown in the FIG. 1, but we can understand that a more important number of mobile terminals MT are in the wireless cellular telecommunication network.

When the mobile terminal MT is located in a cell 15, the mobile terminal MT can establish or receive or continue a communication through the base station BS which manages the cell 15 in which mobile terminal MT is located or can receive a paging notification message.

The server 10 in charge of keeping track of the location of the mobile terminal MT in the wireless cellular telecommunication network, so as to be able to route paging notifications to the base stations BS which control at least a cell 15 in which the mobile terminal MT is expected to be located in. The group of cells in which the mobile terminal MT is expected to be located in is named a Tracking Area. Such paging notification can occur at various occasions, but mainly at the time that an incoming call has to be routed from the network down to the mobile terminal MT. Then, the base station BS can send over the radio, a paging message that the mobile terminal MT can listen to. Once the mobile terminal MT has received the paging message, it can wake up and trigger signalling so as to accept the call.

Each base station BS transfers in each cell 15 it manages, a monitoring list comprising information identifying other cells 15. The mobile terminal MT monitors the signals transferred in these cells 15 and sends measurement reports to the base station BS which manages the cell 15 in which the mobile terminal MT is located.

For example, when the mobile terminal MT is in communication with a remote telecommunication device not shown in the FIG. 1 through a base station BS, that base station BS or the server 10 can decide, according to the measurement report, to proceed to a handover procedure of the communication, i.e. enabling the continuation of the communication through another base station BS.

The base station BS2 and BS3 are linked to the server 10 through communication links noted $25_2$ and $25_3$ in the FIG. 1.

According to the invention, when the base station BS doesn't detect any signal transferred by mobile terminals MT, or when the signals detected by the base station BS have a power level below a predetermined value, the base station BS enters in a non active mode wherein the base station BS reduces to a first predetermined value, the transmission power of signals transmitted in the downlink channel. Once the base station BS detects a signal transferred by a mobile terminal MT or when the signal detected by the base station BS has a power level upper than the predetermined value, the base station BS increases to a second predetermined value, the transmission power of signals transferred in the downlink channel.

In a first mode of realisation of the present invention, the signal or signals detected by the base station BS is or are, as example, received through the uplink channel of the wireless cellular communication system. The signal or signals is or are as example, representative of messages transferred by the mobile terminal MT when it is in communication with a remote telecommunication device through another base station BS. Such messages are transferred through the uplink channel of the wireless cellular telecommunication network and are known as uplink messages. When the base station BS transfers signals, these signals are transferred in the downlink channel of the wireless cellular telecommunication network.

In a second mode of realisation of the present invention, the signal detected by the base station BS is a predetermined signal like a radio signal with a predetermined signature, known in advance by the mobile terminal MT and the base station BS. The signature is as example modulated in a frequency band different from the frequency band used for the uplink channel of the wireless cellular communication system.

In a third mode of realisation of the present invention, the signal received by the base station BS is a signal composed of a predetermined encoded train of energy pulses that are propagated by either radio or optical waves, such as ultra wideband radio waves (UWB) or Infra Red optical waves.

Once the base station BS1 has detected the signal transferred by a mobile terminal MT, the base station BS1 establishes a communication link noted $25_1$ in the FIG. 1 between the base station BS1 and the server 10, obtains from the server 10 the list of active base stations BS2 and BS3 which manage cells 15 which are neighbour of the cell $15_1$ of the base station BS1 and establishes communication links noted $35_2$ and $35_3$ in the FIG. 1 between the base station BS1 and the base stations BS2 and BS3.

Figure 2:
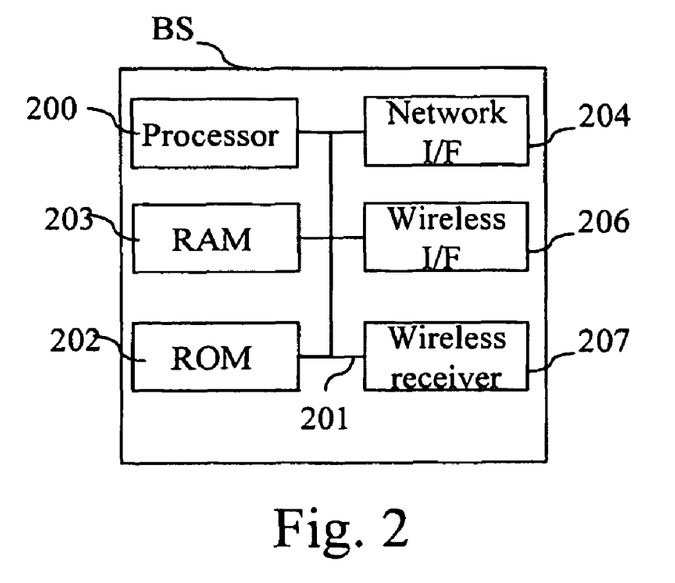
FIG. 2 is a block diagram of a base station according to the present invention.

FIG. 2 is a block diagram of a base station device according to the present invention.

Figure 4A:
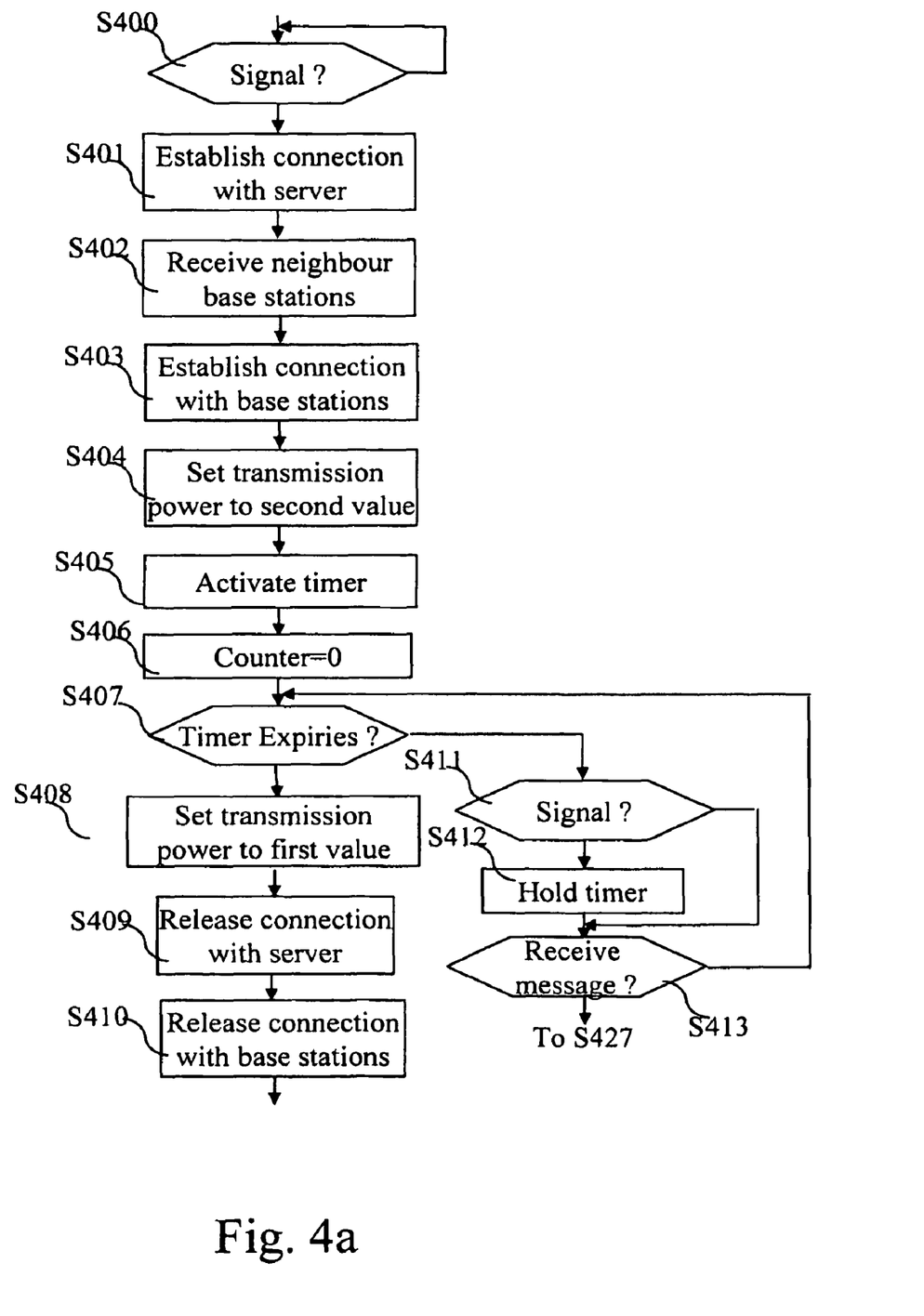
FIGS. 4a and 4b depict an algorithm executed by the base station according to the present invention.
Figure 4B:
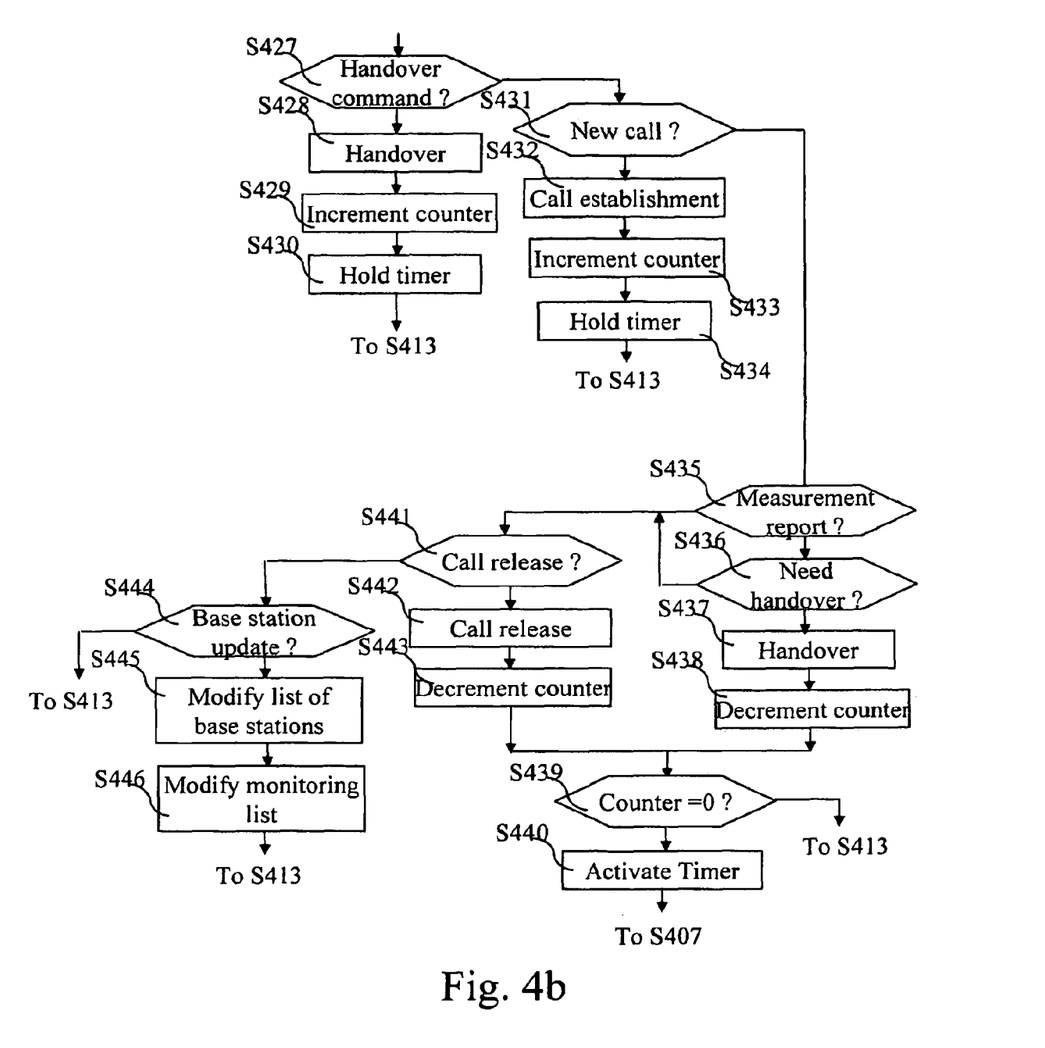

Each base station BS has, for example, an architecture based on components connected together by a bus 201 and a processor 200 controlled by the program as disclosed in the FIGS. 4a and 4b.

The bus 201 links the processor 200 to a read only memory ROM 202, a random access memory RAM 203, a network interface 204 a wireless interface 206 and a wireless receiver 207.

The memory 203 contains registers intended to receive variables, information identifying of cells 15, like cells 15 which are known as neighbour of the cells 15 managed by the base station BS and the identifiers of the base stations BS which manage neighbour cells 15, connection and security information for each communication link with base stations BS which manage neighbour cells and the instructions of the program related to the algorithm as disclosed in the FIGS. 4a and 4b.

The processor 200 controls the operation of the network interface 204, the wireless interface 206 and the wireless receiver 207.

The read only memory 202 contains instructions of the programs related to the algorithm as disclosed in the FIGS. 4a and 4b, which are transferred, when the base station BS is powered on to the random access memory 203.

The base station BS is connected to the telecommunication network through the network interface 204. As example, the network interface 204 is a DSL (Digital Subscriber Line) modem, or an ISDN (Integrated Services Digital Network) interface, etc. Through such interface, the base station BS exchanges information with the server 10 and the other base stations BS of the wireless cellular telecommunication network. The communications established or received by the mobile terminals MT comprised in each cell 15 managed by the base station BS go through the network interface 204 and the wireless interface 206.

The network interface 204 comprises means for establishing and releasing a communication link between the base station BS and the server 10 and means for establishing and releasing a communication link between the base station BS and other base stations BS. The means for establishing and releasing the communication links are distinct from each other or are common.

Through the wireless interface 206, the base station BS transfers monitoring lists of information identifying cells 15 and receives, from the mobile terminal MT, measurement reports.

The wireless interface 206 comprises means for reducing to a first predetermined value, the transmission power of signals transferred in the downlink channel and means for increasing to a second predetermined value, the transmission power of signals transferred in the downlink channel.

The wireless receiver 207 comprises means for detecting a signal transferred by at least one mobile terminal MT.

In the first mode of realisation of the present invention, the wireless receiver 207 is part of the wireless interface 206, as the signal transferred by the at least one mobile terminal MT is a signal representative of a message transferred through the uplink channel.

In the second mode of realisation of the present invention, the wireless receiver 207 comprises means for detecting a predetermined information like a predetermined signature, that is modulated in a frequency band different than the frequency band used for the uplink channel of the wireless cellular communication system. As example, and in a non limitative way, the predetermined signature is carried by a Bluetooth, a WiFi, a WiMAX or a ZigBee signal.

In the third mode of realisation of the present invention, the wireless receiver 207 comprises means for detecting a predetermined information like a predetermined encoded train of energy pulses that are propagated by either radio or optical waves. As example, and in a non limitative way, the predetermined encoded train of energy pulses is an Infra-Red (IrDa) optical signal or a Ultra-wideband (UWB) radio signal.

Figure 3:
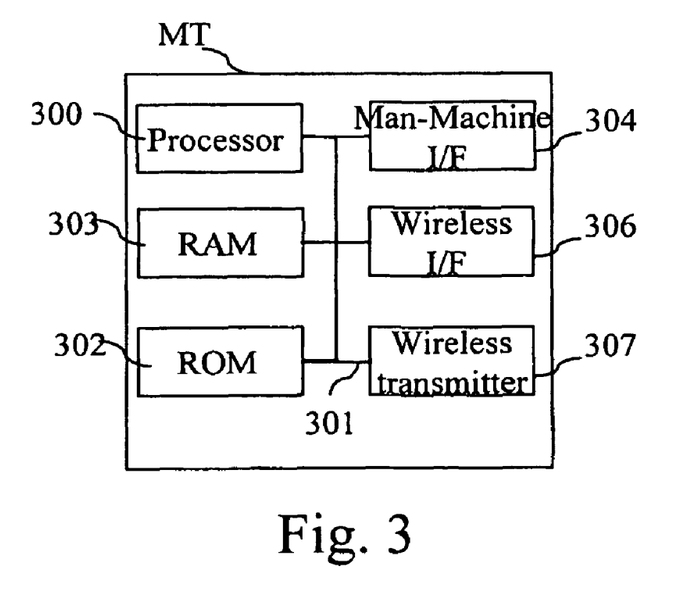
FIG. 3 is a block diagram of a mobile terminal device according to the present invention.

FIG. 3 is a block diagram of a mobile terminal device according to the present invention.

Figure 5:
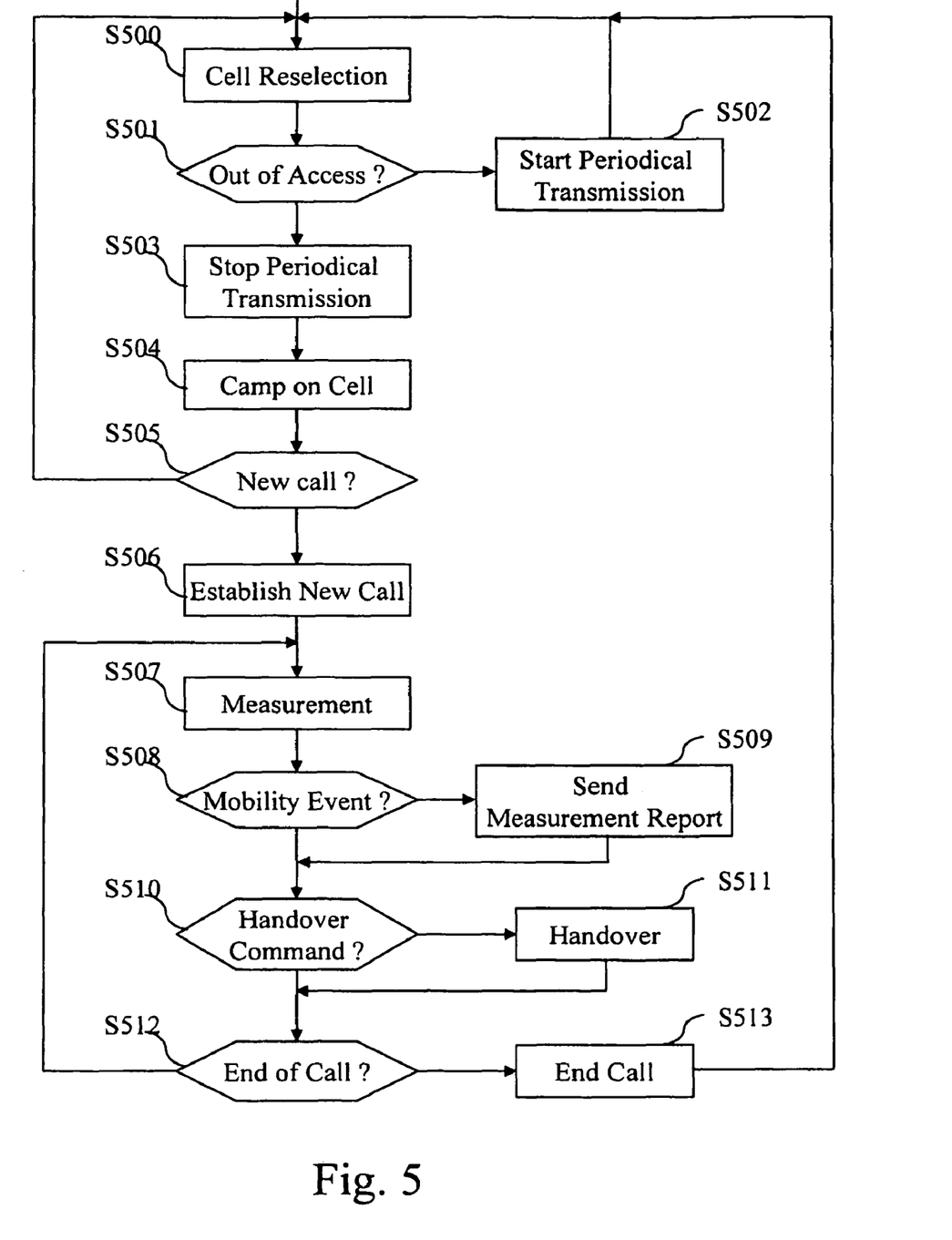
FIG. 5 depicts an algorithm executed by the mobile terminal according to the present invention.

Each mobile terminal MT has, for example, an architecture based on components connected together by a bus 301 and a processor 300 controlled by the program as disclosed in FIG. 5.

The bus 301 links the processor 300 to a read only memory ROM 302, a random access memory RAM 303, a Man-Machine Interface 304, a wireless interface 306, and a wireless transmitter 307.

The memory 303 contains registers intended to receive variables and the instructions of the program related to the algorithm as disclosed in FIG. 5.

The processor 300 controls the operation of the Man-Machine Interface 304, the wireless interface 306 and the wireless transmitter 307.

The read only memory 302 contains instructions of the programs related to the algorithm as disclosed in FIG. 5, which are transferred, when the mobile terminal MT is powered on to the random access memory 503.

The wireless interface 306 comprises means for detecting, measuring and receiving signals transferred by base stations BS through the downlink channel, and for transmitting signals or messages through the uplink channel of the wireless cellular communication system.

The wireless transmitter 307 comprises means for transferring a signal.

In the first mode of realisation of the present invention, the wireless transmitter 307 is part of the wireless interface 306, as the signal transferred by the mobile terminal MT is a signal representative of a message transferred through the uplink channel.

In the second mode of realisation of the present invention, the wireless transmitter 307 comprises means for generating a predetermined signal like a predetermined signature, that is modulated in a frequency band different than the frequency band used for the uplink channel of the wireless cellular communication system. As example, and in a non limitative way, the predetermined signature is carried by a Bluetooth, a WiFi, a WiMAX or a ZigBee signal.

In the third mode of realisation of the present invention, the wireless transmitter 307 comprises means for generating a predetermined signal like a predetermined encoded train of energy pulses that are propagated by either radio or optical waves. As example, and in a non limitative way, the predetermined encoded train of energy pulses is an Infra-Red (IrDa) optical signal or a Ultra-wideband (UWB) radio signal.

FIGS. 4a and 4b depict an algorithm executed by the base station according to the present invention.

More precisely, the present algorithm is executed by the processor 200 of the base station BS. As example, the present algorithm is disclosed when it is executed by the processor 200 of the base station BS1.

At step S400, the processor 200 of the base station BS1 checks if the wireless receiver 207 has detected a predetermined signal transferred by at least one mobile terminal MT.

The predetermined signal transferred by at least one mobile terminal MT is detected when the power of the received signal is upper a predetermined threshold averaged or not over a predetermined time duration.

The predetermined signal is either a predetermined signal indicating the presence of a mobile terminal MT or a signal representative of classical messages transferred by a mobile terminal MT in the uplink channel when the mobile terminal MT is in communication with a remote telecommunication device through another base station BS.

If the predetermined signal transferred by the mobile terminal MT is not detected, the processor 200 returns to step S400 and waits for the detection of the predetermined signal transferred by the mobile terminal MT.

At next step S401, the processor 200 reads in the RAM memory 203 connection and security parameters and commands the network interface 204 in order to establish a communication link with the server 10 with the read parameters. The communication link is noted $25_1$ in the FIG. 1.

At next step S402, the processor 200 receives in response, a list comprising information identifying the base stations BS managing neighbour cells of the cell $15_1$ and which are currently transferring signals at the second transmission power value into the respective cells 15 they are managing or at a transmission power value which is almost identical to the second transmission power value.

According to the example of the FIG. 1, the list comprises information identifying the base stations BS2 and BS3. The list doesn't comprise the identifiers of the base stations BS4 and BS5 because they are not linked to the server 10 and they are transferring signals or messages at the first or almost the first transmission power value into the respective cells $15_4$ and $15_5$ they are managing.

In one implementation mode of the invention, at that step, the processor 200 also receives connection and security parameters for each communication link with the base station BS identified in the received list and stores the connection and security parameters in RAM memory 203. In another implementation mode of the invention, these parameters are stored in RAM memory 203 prior to step S400.

At next step S403, the processor 200 reads in RAM memory 203 connection and security parameters and commands the network interface 204 in order to establish a communication link with the base stations BS identified in the received list with corresponding parameters. A communication link noted $35_2$ in the FIG. 1 is established between the base stations BS1 and BS2 and communication link noted $35_3$ in the FIG. 1 is established between the base stations BS1 and BS3.

Through such communication links the base stations BS2 and BS3 transfer information identifying the cells 15 they are managing and/or handover command messages.

At next S404, the processor 200 commands the wireless interface 206 in order to activate the means for increasing to the second predetermined value, the transmission power of signals transferred in the downlink channel.

The increase of the transmission power of signals is made progressively or abruptly and the second predetermined value is the nominal transmission power of signals transferred in the downlink channel which is as example around one milliWatt.

At next step S405, the processor 200 activates a timer.

At next step S406, the processor 200 sets a variable noted counter to the null value.

At next step S407, the processor 200 checks if the timer activated at step S405 expires or not.

If the timer expires, the processor 200 moves to step S408. Otherwise the processor 200 moves to step S411.

At step S411, the processor 200 checks if the wireless receiver 207 has detected a predetermined signal, like the one disclosed at step S400, transferred by at least one mobile terminal MT.

If the wireless receiver 207 has not detected a predetermined signal transferred by at least one mobile terminal MT, the processor 200 moves to step S413. If the wireless receiver 207 has detected a predetermined signal transferred by at least one mobile terminal MT, the processor 200 moves to step S412.

At step S412, the processor 200 holds the timer activated at step S406.

At next step S413, the processor 200 checks if a message is received through the wireless interface 206 or through the network interface 204.

If a message is received, the processor 200 moves to step S427 of the FIG. 4b. Otherwise, the processor 200 returns to step S407 already described.

At step S408, the processor 200 commands the wireless interface in order to reduce to the first predetermined value, the transmission power of signals in the downlink channel.

The decrease of the transmission power of signals is made progressively or abruptly and the first predetermined value is equal to null value or is equal to less than fifty percents of the second transmission power of signals transferred in the downlink channel.

At next step S409, the processor 200 commands the network interface 204 in order to release the communication link $25_1$ with the server 10. The connection and security parameters used for the communication link $25_1$ are kept in the RAM memory 203.

At next step S410, the processor 200 commands the network interface 204 in order to release the communication link $35_2$ established between the base stations BS1 and BS2 and the communication link $35_3$ established between the base stations BS1 and BS3. The connection and security parameters used for the communication links $35_2$ and $35_3$ are preferably kept in the RAM memory 203.

After that, the processor 200 returns to step S400.

At step S427, the processor 200 checks if the message received at step S413 is a handover command message received from another base station BS.

If the received message is a handover command message received from another base station BS, the processor 200 moves then to step S428. Otherwise, the processor 200 moves to step S431.

At step S428, the processor 200 proceeds to the handover, i.e. enables the continuation of the communication of the mobile terminal MT through the base station BS1.

At next step S428, the processor 200 increments the variable counter.

At next step S430, the processor 200 holds the timer activated at step S406 and returns to step S413.

At step S431, the processor 200 checks if the message received at step S413 is a call establishment command like an acknowledgement message transferred by a mobile terminal MT in response to the reception, by the mobile terminal MT, of a paging notification or a call establishment message transferred by the mobile terminal MT.

If the received message is a call establishment command, the processor 200 moves to step S432. Otherwise, the processor 200 moves to step S435.

At step S432, the processor 200 proceeds to the call establishment. The new communication is transferred through the wireless interface 206 and the network interface 204 of the base station BS1.

At next step S433, the processor 200 increments the variable counter.

At next step S434, the processor 200 holds the timer activated at step S405 or S440 and returns to step S413.

At step S435, the processor 200 checks if the message received at step S413 is a measurement report message received through the wireless interface 206.

Each base station BS transfers in each cell 15 it manages, a monitoring list comprising information identifying other cells 15. The mobile terminal MT monitors the signals transferred in these cells 15 and sends measurement reports to the base station BS which manages the cell 15 in which the mobile terminal MT is located.

If the received message is a measurement report message, the processor 200 moves to step S436. Otherwise, the processor 200 moves to step S441.

At step S436, the processor 200 checks if a handover is needed for the mobile terminal MT, i.e. if the measurement report indicates that the mobile terminal MT should continue the ongoing communication through another base station BS which radiates signals which are received by the mobile terminal MT at a higher reception power level than the one radiated by the base station BS 1 and received by the mobile terminal MT.

If a handover is needed, the processor 200 moves to step S437. Otherwise, the processor 200 moves to step S441.

At step S437, the processor 200 proceeds to the handover, i.e. sends a handover command message to the other base station BS and enables the continuation of the communication of the mobile terminal MT through the other base station BS.

At next step S438, the processor 200 decrements the variable counter.

At next step S439, the processor 200 checks if the variable counter is equal to null value.

If the variable counter is equal to null value, the processor 200 moves to step S413. Otherwise, the processor 200 moves to step S440.

At step S440, the processor 200 activates the timer and returns to step S407 of the FIG. 4a.

At step S441, the processor 200 checks if the received message is a message notifying that an ongoing communication is released.

If the received message is a message notifying that an ongoing communication is released, the processor 200 moves to step S442. Otherwise, the processor 200 moves to step S444.

At step S442, the processor 200 proceeds to the release of the resources used for the ongoing communication.

At next step S443, the processor 200 decrements the variable counter and moves to step S439 already described.

At step S444, the processor 200 checks if the message received at step S413 is a message representative of an update of the list comprising information identifying the neighbour base stations BS which are currently transferring signals or messages into the respective cells 15 they are managing.

The message is as example a message indicating the release of one link established between two base stations BS or a message indicating the establishment of one link established between two base stations BS.

If the received message is a message representative of an update of the list, the processor 200 moves to step S445. Otherwise, the processor 20 returns to step S413.

At step S445, the processor 200 modifies the list comprising information identifying the neighbour base stations BS which are currently transferring signals or messages into the respective cells 15 they are managing.

At next step S446, the processor 200 modifies the monitoring list comprising information identifying other cells 15 and returns to step S413.

FIG. 5 depicts an algorithm executed by the mobile terminal according to the present invention.

More precisely, the present algorithm is executed by the processor 300 of the mobile terminal MT.

At step S500, the mobile terminal MT is in idle mode and the processor 300 commands a cell reselection procedure to the wireless interface 306. The cell reselection procedure consists in scanning at least one frequency band in order to detect signals identifying at least one cell 15 transferred into the at least one frequency band. At that step, the processor 300 identifies the best cell 15, like the one identified by the strongest detected signal power that covers the mobile terminal MT.

At next step S501, the processor 300 checks if the mobile terminal MT is out of access of the cellular wireless communication network. The mobile terminal MT is out of access of the wireless cellular communication network when no signal transferred by one base station BS is detected. The signal is as example and in a non limitative way, a signal identifying a cell 15 of the wireless cellular telecommunication network. Preferably and in a non limitative way, a signal identifying a cell 15 is not detected when the reception power of the signal is below a predetermined threshold.

If at step S501, the mobile terminal MT is out of access, the processor 300 moves to step S502. If at step S501, the mobile terminal MT is not out of access, the processor 300 moves to step S503.

At step S502, the processor 300 commands the wireless transmitter 307 to start transferring a predetermined signal.

Preferably and in a non limitative way, the predetermined signal is transferred periodically.

In the first mode of realisation of the present invention, the predetermined signal transferred by the at least one mobile terminal MT is a signal transferred through the uplink channel.

In the second mode of realisation of the present invention, the predetermined signal is a predetermined signature, that is modulated in a frequency band different from the frequency band used for the uplink channel of the wireless cellular communication system. As example, and in a non limitative way, the predetermined signature is carried by a Bluetooth, a WiFi, a WiMAX or a ZigBee signal.

In the third mode of realisation of the present invention, the predetermined signal is a predetermined encoded train of energy pulses that are propagated by either radio or optical waves. As example, and in a non limitative way, the predetermined encoded train of energy pulses is an Infra-Red (IrDa) optical signal or a Ultra-wideband (UWB) radio signal.

The period of transmission of the predetermined signal is preferably smaller than the expiration duration of the timer of the base station BS disclosed at step S407 of FIG. 4a.

After that, the processor 300 returns to step S500.

At step S503, the processor 300 commands the wireless transmitter 307 to stop transfer periodically the predetermined signal, and moves to step S504.

At next step S504, the processor 300 orders the wireless interface 306 to camp on the cell 15 detected at step S500. If the cell 15 detected at step S500 is a newly detected cell 15 that does not belong to the tracking area of the mobile terminal MT, the processor 300 orders the transfer of a tracking area update message through the wireless interface 306 and receives an acknowledgement message in which a new tracking area is assigned to the mobile terminal MT.

At next step S505, the processor 300 checks if a new call has to be established. A new call has to be established when an order is received from the man machine interface. Such order is received after reception through the wireless interface 306 of a paging notification message received from the server 10, reflecting the occurrence of an incoming call, or is received when the user of the mobile terminal MT decides to trigger a new outgoing call.

If at step S505, a new call has to be established, the processor 300 moves to step S506. Else, the processor 300 returns to step S500.

At step S506, the processor 300 commands the wireless interface 306 to send a call establishment command message and to establish a new call in the cell detected at step S500. The mobile terminal MT enters into an active mode.

At next step S507, the processor 300 gets a measurement report from the wireless interface 306 on the neighbour cell 15 of the base station BS through which the call is going through and of the cell 15 of the base station BS through which the call is going through, as disclosed at steps S506 or S511.

At next step S508, the processor 300 checks if a mobility event occurred. A mobility event occurs when the measurement report obtained at step S507 shows that the received signal level of a neighbour cell 15 gets higher than the received signal level of the cell 15 of the base station BS through which the call is going through, or gets higher than a predetermined threshold, or if the signal level of the cell 15 of the base station BS through which the call is going through, gets lower than an other predetermined threshold.

If at step S508, a mobility event occurred, the processor 300 moves to step S509. Else, the processor 300 moves to step S510.

At step S509, the processor 300 commands the wireless interface 306 to send a measurement report message to the base station BS through which the call is going through. The measurement report message contains at least a part of the measurement information obtained at step S507 and/or identification of the mobility event detected at step S508 and/or identification of the cells 15 involved in the mobility event detected at step S508.

At next step S510, the processor 300 checks the reception, through the wireless interface 306, of a handover command message. A handover command message is representative of an order by the base station 15 through which the call is going through, to continue the call through another base station BS of the wireless cellular communication network.

If, at step S510, a handover command message is received, the processor 300 moves to step S511. Else, the processor 300 moves to step S512.

At step S511, the processor 300 orders the wireless interface 306 to continue the call through the base station BS which manages the cell 15 indicated in the handover command message received at step S510. Once the call is being passed through the base station BS which manages the cell 15 indicated in the handover command message received at step S510, the processor 300 moves to step S512.

At step S512, the processor 300 checks if the call has to be ended. A call has to be ended when the processor 300 receives an order from the man machine interface 304, or if the quality of the signals conveying the call is not sufficient, or if a message is received from the wireless interface 306 that the call has to be ended.

If at step S512, the call has to be ended, the processor 300 moves to step S513. Else, the processor 300 returns to step S507 to step S507.

At step S513, the processor 300 commands the wireless interface 306 to end the communication call and moves to step S500, in idle mode.

Naturally, many modifications can be made to the embodiments of the invention described above without departing from the scope of the present invention.

The invention claimed is:

1. A method for controlling operation of a first base station of a wireless cellular telecommunication network including plural base stations and a server, the method executed by the first base station comprising:

setting transmission power of signals transferred by the first base station in a cell managed by the first base station at a first transmission power value;

detecting a predetermined signal transferred by a mobile terminal of the wireless cellular telecommunication network;

and if a predetermined signal transferred by the mobile terminal is detected:

establishing a communication link with the server;

obtaining, from the server, information identifying each second base station that manages a cell that is neighbour of the cell managed by the first base station and that is transferring signals in the cell the second base station manages at a transmission power higher than the first transmission power value;

establishing a communication link with each second base station; and setting the transmission power of the signals transferred by the first base station in the cell managed by the first base station at a second transmission power value higher than the first transmission power.

2. A method according to claim 1, further comprising, when the transmission power of the signals transferred by the first base station in the cell managed by the first base station is set at the higher transmission power value than the first transmission power:

activating a timer; and checking if at least another predetermined signal is transferred by the or another mobile terminal of the wireless cellular telecommunication network.

3. A method according to claim 1, further comprising:

monitoring a number of mobile terminals in communication with at least one remote telecommunication device through the first base station; and activating a timer if no mobile terminal is in communication with one remote telecommunication device through the first base station.

4. A method according to claim 3, further comprising deactivating the timer if at least another predetermined signal is transferred by the or another mobile terminal of the wireless cellular telecommunication network or if at least one mobile terminal is in communication with at least one remote telecommunication device through the first base station.

5. A method according to claim 4, further comprising:

checking if the timer expires, and if the timer expires:

releasing the communication links with the server and with each second base station; and setting the transmission power of the signals transferred by the first base station in the cell managed by the first base station at the first transmission power value.

6. A method according to claim 1, wherein the first transmission power value is equal to null value.

7. A method according to claim 6, wherein the first base station transfers in the cell managed by the first base station a list comprising information identifying each neighbour of the cell managed by the first base station in which the signals are transferred at the higher transmission power.

8. A method according to claim 1, wherein the predetermined signal is transferred periodically.

9. A method according to claim 1, wherein the predetermined signal is representative of an uplink message of the wireless cellular communication system.

10. A method according to claim 1, wherein the predetermined signal is a predetermined signature, that is modulated in a frequency band different than a frequency band used for a transmission of message from the mobile terminal to the base station.

11. A method according to claim 1, wherein the predetermined signal is a predetermined encoded train of energy pulses that are propagated by radio or optical waves.

12. A device controlling operation of a first base station of a wireless cellular telecommunication network including plural base stations and a server, the device being included in the first base station and comprising;

means for setting the transmission power of the signals transferred by the first base station in the cell managed by the first base station at a first transmission power value;

means for detecting a predetermined signal transferred by a mobile terminal of the wireless cellular telecommunication network;

means for establishing a communication link with a server;

means for obtaining from the server, information identifying each second base station that manages a cell that is neighbour of the cell managed by the first base station and that is transferring signals in the cell the second base station manages at a transmission power higher than the first transmission power value;

means for establishing a communication link with each second base station; and means for setting the transmission power of the signals transferred by the first base station in the cell managed by the first base station at a second transmission power value higher than the first transmission power.

13. A computer recordable medium including computer executable instructions that can be directly loadable into a programmable device, comprising computer executable instructions implementing the method according to claim 1, when said computer executable instructions are executed on a programmable device.

* * * * *